(12) United States Patent
Kim et al.

(10) Patent No.: US 12,136,843 B2
(45) Date of Patent: Nov. 5, 2024

(54) ELEVATOR EMERGENCY POWER SYSTEMS AND METHODS

(71) Applicants: Junkyeong Kim, Rancho Cucamonga, CA (US); Minjun Seo, Rancho Cucamonga, CA (US); Darin Morgan, Rancho Cucamonga, CA (US)

(72) Inventors: Junkyeong Kim, Rancho Cucamonga, CA (US); Minjun Seo, Rancho Cucamonga, CA (US); Darin Morgan, Rancho Cucamonga, CA (US)

(73) Assignee: MicroNOC Inc., Rancho Cucamonga, CA (US)

( * ) Notice: Subject to any disclaimer, the term of this patent is extended or adjusted under 35 U.S.C. 154(b) by 184 days.

(21) Appl. No.: 17/686,709

(22) Filed: Mar. 4, 2022

(65) Prior Publication Data
US 2023/0327472 A1 Oct. 12, 2023

Related U.S. Application Data

(63) Continuation-in-part of application No. 16/576,762, filed on Sep. 19, 2019, now Pat. No. 11,177,661.

(51) Int. Cl.
H02J 7/00 (2006.01)
G05B 15/02 (2006.01)
H02J 9/06 (2006.01)

(52) U.S. Cl.
CPC ...... *H02J 7/007182* (2020.01); *H02J 7/0029* (2013.01); *H02J 7/0068* (2013.01); *H02J 9/062* (2013.01); *G05B 15/02* (2013.01)

(58) Field of Classification Search
CPC .. H02J 7/007182; H02J 7/0029; H02J 7/0068; H02J 9/062; H02J 3/32; H02J 7/35; H02J 2310/12; G06Q 10/06; G06Q 50/163; G06Q 50/265; G06Q 50/06; Y02B 10/10; Y02B 90/20; Y02E 10/56; Y02P 90/50; Y04S 20/12; Y04S 40/121; G05B 15/02
See application file for complete search history.

(56) References Cited

U.S. PATENT DOCUMENTS

| | | | |
|---|---|---|---|
| 2014/0008155 A1* | 1/2014 | Rossignol | B66B 1/302 187/290 |
| 2016/0226255 A1* | 8/2016 | Sugeno | H02J 3/14 |
| 2018/0048159 A1* | 2/2018 | Narla | H02S 40/30 |
| 2018/0237268 A1* | 8/2018 | Agirman | B66B 1/302 |
| 2022/0216716 A1* | 7/2022 | Han | H02J 7/00712 |

* cited by examiner

*Primary Examiner* — Yuhui R Pan
(74) *Attorney, Agent, or Firm* — PatentPC

(57) ABSTRACT

A system to supply emergency power to an elevator includes one or more lithium batteries, an inverter coupled to the lithium batteries, a battery management system (BMS) coupled to the inverter, an Energy Management Software (EMS) coupled to the BMS, and a relay coupled to utility power, wherein the relay operates to provide utility power to the system and notifies the EMS that utility power is on, wherein the EMS initiates charging of the BMS system, wherein the BMS sends charging command to the inverter, which operates until the state of charge is 100%, where the inverter goes into a standby mode.

20 Claims, 7 Drawing Sheets

ELEVATOR EMERGENCY POWER SYSTEMS AND METHODS

BACKGROUND

A new mandate has been applied to a building facility equipped with an elevator for Emergency Power System. National Electrical Code (NEC) 700 requires the Emergency System to support elevators as well as emergency lightings with a minimum operation of 90 minutes during grid power outrage. America Disability Acts (ADA) also strongly promotes such mandates for life safety.

In a parallel trend, the IBC (International Building Code) requires buildings that are four or more stories to have the elevator to be part of the standby power system. Potentially, many new projects would now be required to implement a standby generator into the electrical distribution system.

The current industrial environment discourages the use diesel/gas backup generator and prefers battery solutions to support the Emergency Power System. Uninterrupted Power Supply (UPS) generally uses Lead Acid/Absorbed Glass Mat (AGM) and wet cell or "flooded" batteries are both considered lead batteries and contain an electrolyte solution which causes a chemical reaction and produces electrons. These batteries require large space for 90 minute-requirement with the relatively short lifetime of 3-4 years due to its self-degradation chemical characteristics.

SUMMARY

In one aspect, an Emergency Power System integrates a Lithium-Ion battery system into Emergency Power System and obtained for the first time UL924 certification which represents a compliance with NEC 700. The system uses bi-directional smart inverters, Lithium-Ion batteries, contactors, relay, energy management control system and other devices. A processor executes a Sequence of Operations and performs software energy management control system.

In another aspect, a CEP Unit integrates contactors, relay, energy management control system, Lithium-ion batteries, and other devices in order to function dual mode of the bi-directional smart inverters in On-Grid Mode and Off-Grid Mode. Bi-directional smart inverter detects commercial power or commercial power outrage by CEP Unit and delivers the signals to energy management control system to run system On-Grid or Off-Grid mode.

In another aspect, energy management control system enables CEP system for energy saving during a normal commercial power supply and for emergency power during a power outrage.

In another aspect, a system is disclosed that supplies emergency power to an elevator. The system includes a lithium energy storage device, an inverter coupled to the lithium energy storage device, a battery management system (BMS) coupled to the inverter, an Energy Management Software (EMS) coupled to the BMS, and a relay coupled to utility power, wherein the relay operates to provide utility power to the system and notifies the EMS that utility power is on, wherein the EMS initiates charging of the BMS system, wherein the BMS sends charging command to the inverter, which operates until the state of charge is 100%, where the inverter goes into a standby mode.

In another aspect, a method supplies emergency power to an elevator using a system with a lithium energy storage device, an inverter coupled to the lithium energy storage device, a battery management system (BMS) coupled to the inverter, an Energy Management Software (EMS) coupled to the BMS, and a relay coupled to utility power. The method includes operating the relay to provide utility power to the system and notifying the EMS that utility power is on, charging the BMS system when the BMS sends a charging command to the inverter, and operating the inverter until a state of charge is 100%, and placing the inverter into a standby mode.

Advantages of the system may include one or more of the following. The system provides conveniences of disabling and life safety during power outrage as well as minimizing use of diesel/gas backup generators for clean environment. The use of Lithium Ion batteries is advantageous in that lithium batteries are compact in size, approximately one-fifth of volume size of Lead Acid ones, and have much longer life-span of 10-years with minimum self-degradation. The digital transformation of utilities is supported by full mobilization of assets such as elevator emergency system in a reliable way to ensure maximum transmission of energy from multiple sources. High renewable energy penetration, intermittency and low inertia generate an increased level of threats, which require a full understanding of real-time and future network status, to allow a fast response as rapid changes occur.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1A:
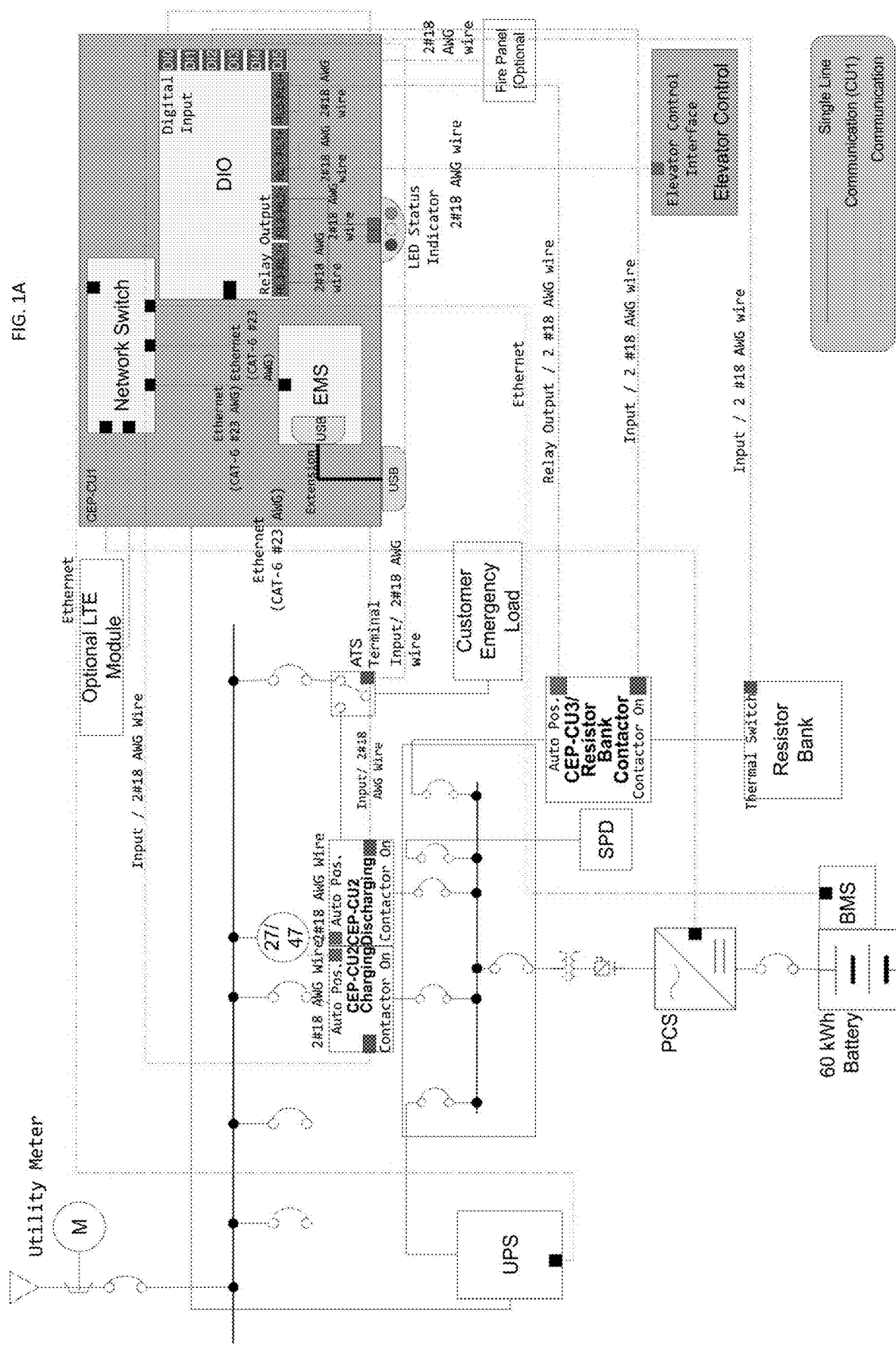
FIG. 1A shows an exemplary single line and communication diagram showing the overview of CEP units and related entities.

FIG. 1A shows an exemplary single line and communication diagram showing the overview of CEP units and related entities to supply emergency power to the system of FIG. 1A. CEP Units consist of CEP-CU1, CEP-CU-2 and CEP-CU3. CEP-CU2 detects on-grid commercial power or off-grid power outrage and sends signal to CEP-CU1 energy management control system. During power outrage, CEP-CU3 detects power generated by a regenerative system of elevator and sends signal to CEP-CU1 energy management control system to transport the regenerative power either to charge Lithium-Ion battery or to dissipate by resistor banks. The system of FIG. 1 has the following:

- 27/47—protective relay that senses an undervoltage or a phase imbalance in the electrical distribution system
- CEP-CU2 contactor (charging and discharging)—close the applicable circuit when charging or discharging the battery is required (charging and discharging contactors are interlocked so that they are not energized simultaneously)
- ATS—automatic transfer switch (switches to the power source that is on)
- UPS (uninterruptible power supply)
- SPD (surge protective device)
- PCS (power conversion system)
- BMS (battery monitoring system)
- CEP-CU3 resistor bank contactor—controls whether the resistor bank is connected to the battery circuit, based on the level of battery charge. The resistor bank dissipates excess energy generated by the elevator motor.
- CEP-CU1 enclosure—contains EMS (energy management system), Network switch (hub for communication), DIO module (receives inputs and generates outputs based on computer program logic within EMS) and a 24 VDC power supply that powers the DIO module.

Figure 1B:
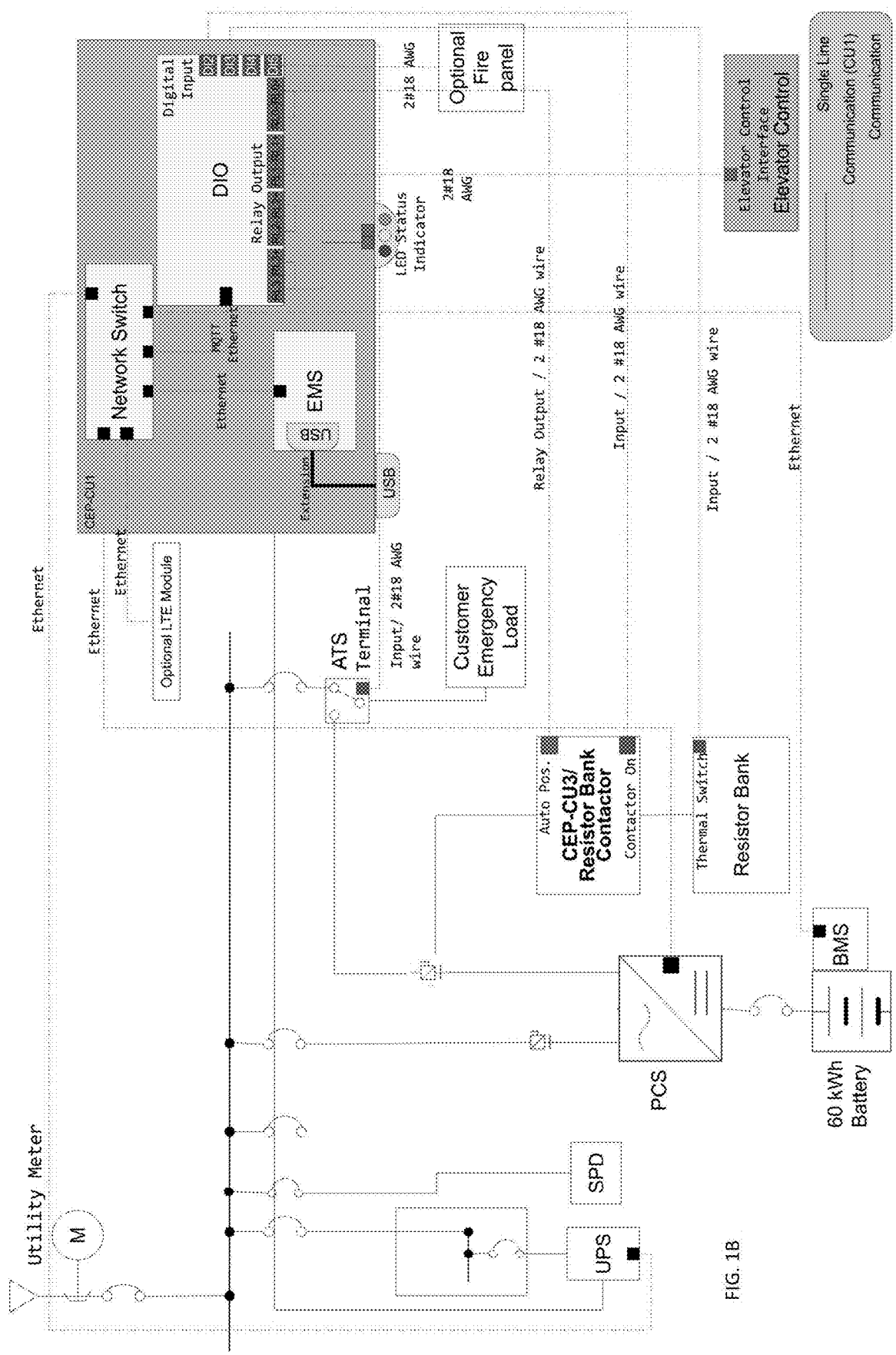
FIG. 1B shows an exemplary single line and communication diagram showing the overview of an alternative CEP units and related entities

FIG. 1B shows exemplary single line diagram showing the overview of an alternative CEP Units and related entities to supply emergency power to the system. Bi-directional smart inverter, or power conversion system (PCS), shall have an option that automatically changes its mode from ON GRID to OFF GRID when commercial power is lost, mimicking the function of an ATS. This shall include the PCS having a pair of three phase terminals, three terminals dedicated for charging batteries and a three dedicated for discharging of batteries.

Figure 2A:
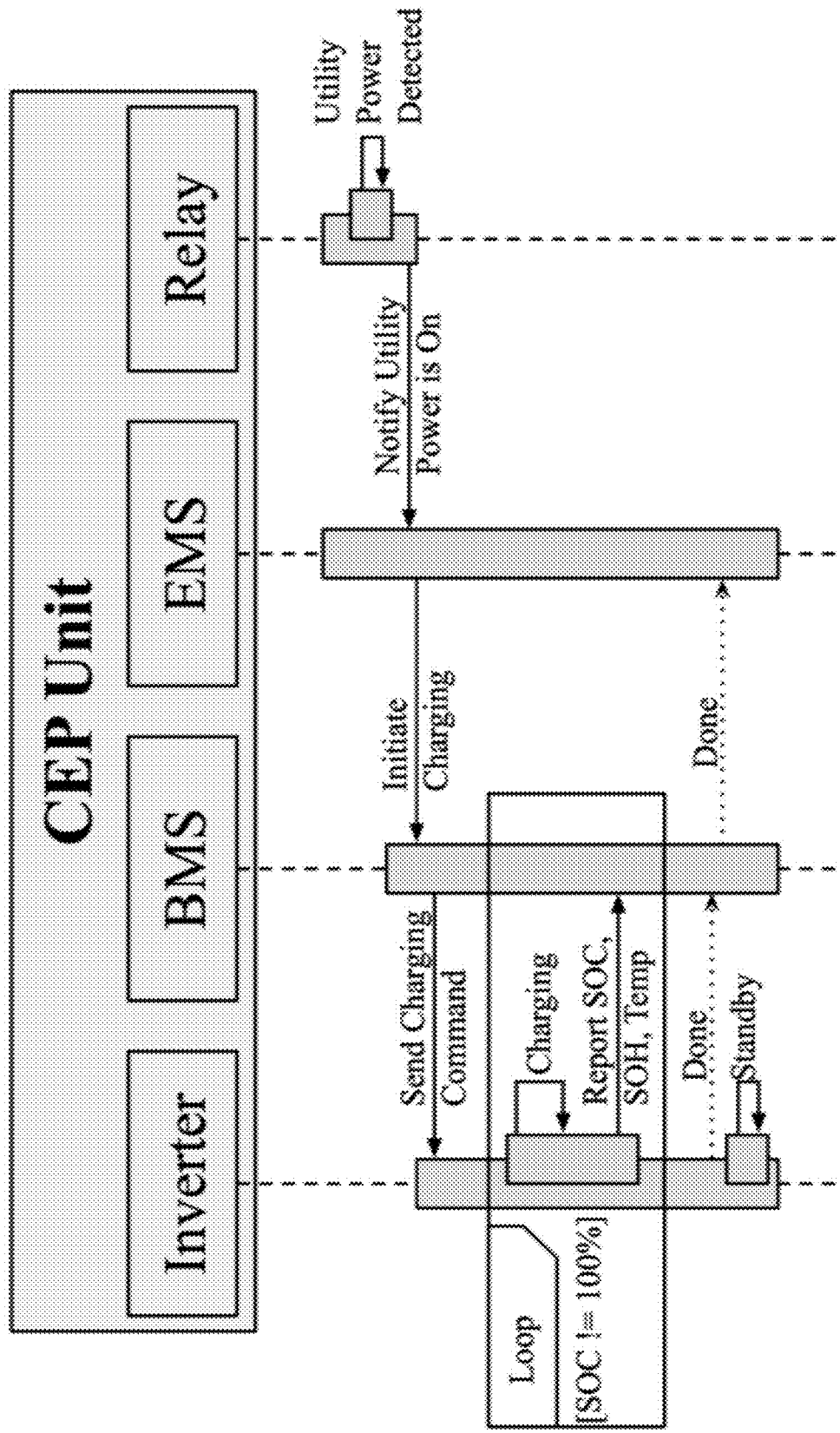
FIGS. 2A-2B show exemplary sequence diagram showing the operation of CEP units and related entities in normal operation.
Figure 2B:
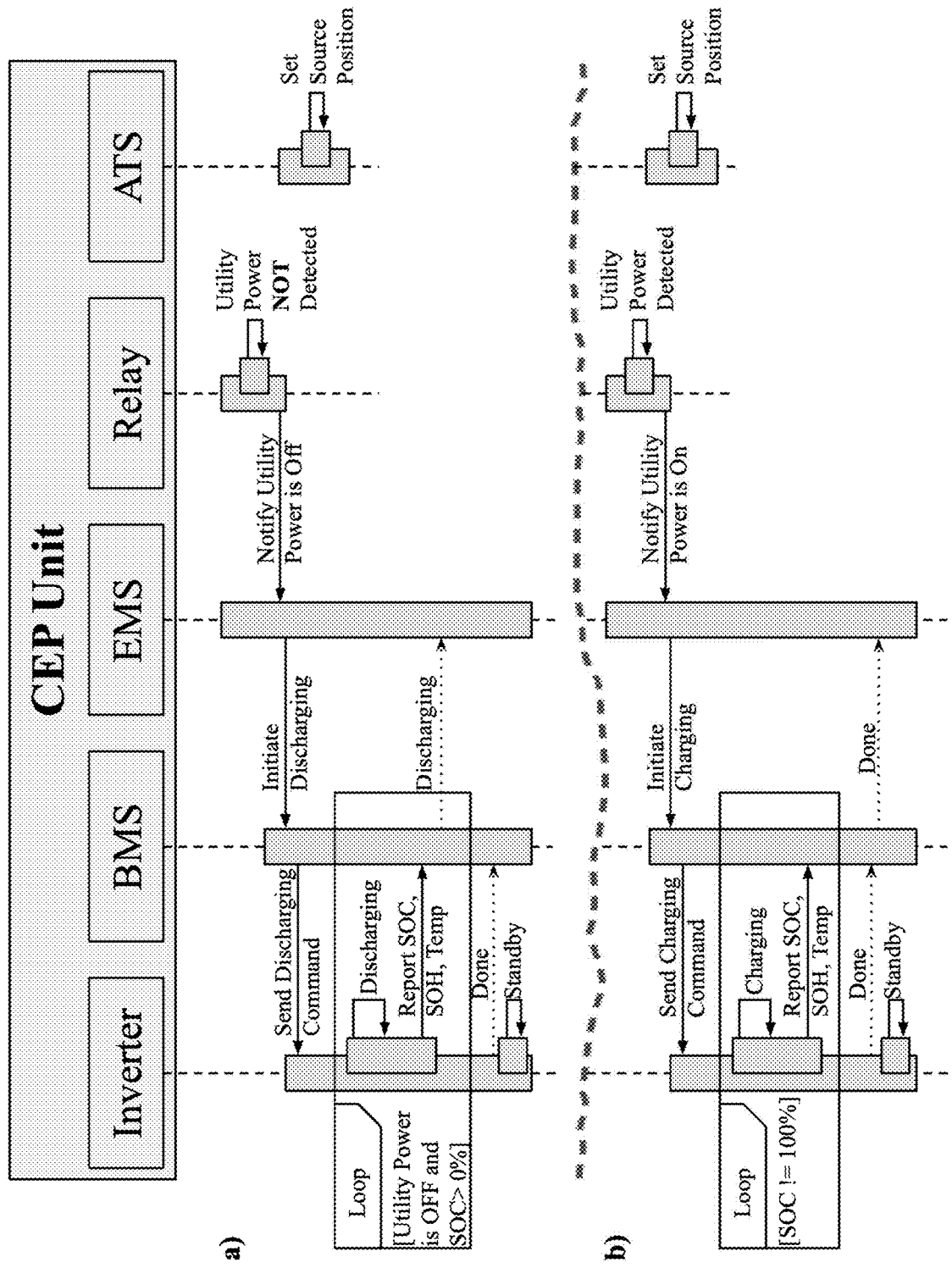

FIG. 2 shows exemplary sequence diagram showing the operation of CEP units and related entities in normal operation. In the text and figures, the following abbreviations have the following meanings:

| N.O. | Normally Open | SOC | State of Charge (Nominal Energy) |
|---|---|---|---|
| N.C. | Normally Closed | ATS | Automatic Transfer Switch |
| DIO | Digital Input Output (Module) | BESS | Battery Energy Storage System |
| DI | Digital Input | EMS | Energy Management System |
| RL | Relay Output | BMS | Battery Management System |
| CU1 | CEP-Control Unit #1 | PCS | Power Conversion System |
| CU2 | CEP-Control Unit #2 | UPS | Uninterruptible Power Supply |
| CU3 | CEP-Control Unit #3 | >> | Inside of (ex. DIO >> CU1) |

The latest codes and regulations are beginning to require the use of clean, reliable, and renewable power sources to provide backup power under emergency conditions. Therefore, the use of power sources such as diesel generators are increasingly being frowned upon. Uninterruptible power supplies (UPS) provide an acceptable solution for some applications, but these power sources are not capable of addressing regenerative power that is occasionally created from loads such motors. The CEP emergency power system is designed to provide a secondary source of power to supply critical loads when commercial power goes down, relative to a UPS, but it also has the capability to address regenerative power produced by inductive loads because it is a bi-directional power source through use of conventional devices such as power conversion system (PCS), relays, contactor coils and resistor bank. The PCS both charges the batteries of the CEP system and inverts the DC power to AC power to supply loads. An external relay controls the opening and closing of the charging and discharging circuits to the CEP emergency power system. The CEP system uses a resistor bank to dissipate any regenerative power produced by the load if the CEP's batteries are fully charged and uses an energy management system (EMS) to control the resistor bank.

The system of FIG. 1 can be used with an elevator management system that is integrated into a building management program that interfaces with an elevator car designed to move along a hoist way within a building or other occupiable structures. Each floor may have an elevator station that may signal to the elevator car that an individual wishes to go up or down. The building management system could also include a computing device, a status system, and a user interface. A control circuitry, such as a processor and a computer-readable storage medium, may be included in the building computing device. The storage medium may include hard disk drive storage, nonvolatile memory (e.g., flash memory or other electrically-programmable-read-only memory configured to form a solid-state drive), volatile memory (e.g., static or dynamic random-access-memory), and others. The processor can be built on one or more of the following: microprocessors and microcontrollers; digital signal processors; baseband processors; power management units; audio codec chips; application specific integrated circuits; and others. The processor and the storage medium can be used to control or receive signals from any system of the building status systems. A building status system could include at least one of the following: a fire alarm system, a security system, an environment alert system and an energy usage alert program. It also may include an elevator service alert system. Examples of multi-level, occupiable structures include residential homes, apartments, commercial buildings and ships. Each floor of the occupiable building can have any number of rooms. There may be multiple routes connecting the floors and rooms (i.e. entry and exit) which may include stairs, elevators and hallways. The building computer processor of the building computing device can receive alert and/or building condition signals in real time over a path. The building computer processor can process building condition signals using information pre-programmed into computer readable medium.

As shown in FIG. 2A, a CEP unit includes an inverter, a battery management system (BMS), an Energy Management Software (EMS), and a relay. The relay operates to provide utility power to the system and notifies the EMS that utility power is on. The EMS initiates charging of the BMS system. The BMS sends charging command to the inverter, which operates until the state of charge is 100%, where the inverter goes into a standby mode. Meanwhile, the inverter reports the SOC, SOH and temperature to the BMS for management. When the battery is charged, the BMS reports completion to the EMS.

The CEP emergency power unit is in charging mode while commercial/utility power is on. This is a result of the undervoltage/phase imbalance relay energizing a contactor coil that closes a charging circuit to the CEP unit. The PCS will charge the batteries of the CEP unit until they reach 75% of their capacity. CEP Unit sets 75% of PCS capacity in order to comply with the minimum requirement of 90-minutes operation by using 120-minute capacity of battery storage. For example, if the system capacity of CEP is 30 kW/60 kWh, CEP Unit limits charging 75% or 52.5 kWh while leaving 25% room for battery storage to utilize and save excess amount of energy produced by regenerative power from elevators. If, while commercial power is on, the elevator provides regenerator power and it reaches the CEP unit, the CEP unit will allow the PCS to charge the batteries up to 100% of their capacity. Once batteries reach 100% charge capacity, the EMS (energy management system) will allow a resistor bank to connect to the charging circuit if regenerative power is created by elevator (this occurs whether commercial power is on or off). When commercial power is lost, the undervoltage/phase imbalance relay de-energizes the charging contactor circuit to the CEP unit, while energizing a contactor coil that closes a discharging circuit from the CEP unit to an automatic transfer switch (ATS), which feeds the elevator and its ancillary load. Consequently, the ATS shall switch from the primary position to the secondary position. Thus, this configuration shall allow the CEP unit to operate the elevator and its ancillary loads in instance where there is no commercial power. When commercial power is restored, the undervoltage/phase imbalance relay de-energizes the discharging circuit and re-energizes charging circuit of the CEP unit. The ATS switches from the secondary position to the primary position. The CEP unit resumes charging if its battery capacity is less than 75%.

CEP Unit: Normal Power Operation

The CEP unit shall be in charging mode while commercial/utility power is on (commercial power is delivering nominal voltage). The charging circuit contactor shall be energized/closed and the discharging circuit contactor shall be de-energized/open (refer to CEP unit Single Line Diagram). The 27/47 relay shall be energized; the N.O. (normally open) auxiliary contact of relay shall energize the relay coil of the charging contactor while the charging contactor enclosure is in auto mode. The N.C. (normally closed) auxiliary contact of relay shall be open so that the coil of the discharging contactor remains de-energized while the discharging contactor enclosure is in auto mode (N.C. auxiliary contact of relay is connected to discharging contactor coil; N.O. auxiliary contact of relay is connected to charging contactor coil). The N.O. auxiliary contact of charging contactor shall be fed into DI #1 input of DI/O module and N.O. auxiliary contact of discharging contactor shall be fed into DI #0 input of DI/O module. ATS shall be in the primary (normal) source position. FIG. 1 shows a sequence diagram of how the CEP-EMS (Energy Management System), relay, BMS, and inverter interact in normal operation.

The 27/47 relay shall sense no power, undervoltage, or phase loss/imbalance. The relay shall de-energize, opening (de-energizing the contactor coil) the charging contactor and closing (energizing) the discharging contactor. Corresponding auxiliary contacts shall change state, providing input to DI/O module and thus notifying EMS of emergency status. The CEP unit's PCS shall change from charging mode to discharging mode and begin discharging via command from EMS. The ATS shall switch from primary to secondary (emergency) source position. FIG. 2 a) shows how the EMS detects utility power interrupted and performs discharge operations.

CEP Unit: Energy Saving Operation in a Normal Power Mode

In normal mode, the Energy Management Control System in CEP-CU1 can include the energy saving system as described Ser. No. 16/576,762 filed Feb. 19, 2019 and U.S. Pat. No. 17,180,502 filed Feb. 19, 2021, the contents of which are incorporated by reference. In addition to emergency power supply, energy management control system in CEP Unit contains full software program featured with QBR system to deliver energy during peak hours to reduce peak power consumption. Validated Customer's Profile will be used to pre-program Customer's Green Button (GB) data to optimize energy saving capacity. CEP Unit will conduct a normal sequence of operations to delivery energy to the customer's facility during peak hours to save a utility bill.

The system can include a network operation center (NOC). As the NOC controls a large number of distributed equipment that can provide precise available power for the grid operation on demand, the NOC acts as virtual power plant whose power can be drawn on-demand over a selected period to avoid high costs and electricity losses of peaking plants while assisting in the relief of congestion interties of electricity transporting through the grid, for example. In one embodiment, the set of User Interfaces consists of, a) Logging in with user name and Id.
b) Click on ESSEmulator.
c) Select customer's profile from the list.
d) Select from 'Validate Customers Profile (VCP)', ARES™ (50, 75, 95), Conventional Solar.
e) Click on customer load graph to view Monthly to Daily, Daily to 15 Min interval.
f) Click 'Back' button to view 15 Min interval to Daily, and Daily to Monthly.
g) Click 'Back to all' button to view 15 Min interval or Daily to Monthly Graph.

Customers who are registered with the system and connected with 15 min interval data such as Green Button to the system database will be profiled in the savings simulator. Utility Tariff Rate Schedule, energy consumption pattern will be displayed.

The system operator can select Customer from the list, and the site load data, and tariff rate schedule will be automatically displayed. Next, QBR Analysis software will be providing optimal input capacity by looking at the highest peak and lowest peak during the peak hours. The 95 percent of lowest peak, and 50% of the highest peak. Whichever has lower value will be the optimal input capacity. The software will display demand cut (50%, 75%, 95%) on the customers load graph during highest peak hours (4 pm to 9 pm). The optimized scenario adjusts system output so that the lowest power consumption is at zero. The savings caused by Energy Storage System will be generated and displayed. The software can display the highest peak date graph with 50%, 75%, 95%, and optimized graph of highest peak during peak hours. That will be used as system input capacity and will display demand cut by the input capacity during the highest peak (4 pm to 9 pm) and savings will be generated based on the amount cut and tariff schedule. A conventional Solar Analysis can also be done to show the difference between traditional solar on demand/usage at site versus AERS™ optimum with or without solar, where the software will display solar kWh cut on the customers load graph during sun hours (11 am to 5 pm). The solar input and output data are based on NREL PVwatt calculator where QBR analysis system connects directly with through API. A visual of traditional and optimum of solar kWh cut will be displayed on the customers load graph during the sun hours and highest peak expensive hours of grid. Using customer's address information, NREL API will provided the solar input and output data to generate the enhanced QBR ESS+ Solar system projection data.

QBR savings analysis report for ESS+ Solar specializes in analyzing optimum system capacity based on load analysis of site for the purpose of reliability, congestion relief, cost reduction and deferral needs of grid operation rather than the traditional increasing of solar system capacity and alteration of utility rate tariff to accommodate grid balancing. Solar generation can then significantly be in a real-time controllable environment to be utilized at the proper times of load usage and grid needs with less costs for customers, utility and grid operators.

In determining the client profile, the process obtains a Validated Customer/Clients Profile (VCP). The customer authorizes and provides 15 min interval data, and in one embodiment with PG&E as the utility, this is done via a Green Button connection ("Validation Process"). The most recent one-year data of the customer's consumption behavior is digitized by yearly/monthly/daily patterns to find the Demand Peak Patterns and the Patterns during ON PEAK hours under Utility Tariffs. Typically the utility and grid operators provides 2-3 times more demand capacity than actual usage of clients. This causes significant "waste" by oversupplying energy, transmission delivery capacity (T-Demand) and distribution delivery capacity (D-Demand). The system performs synchronizing of customer's pattern into Grid operation, which is the ultimate goal of "Balancing."

Next, the process of emulating and optimizing BTM Resources and Savings is detailed. An Emulator calculates and optimizes the capacity of BTM resources which can be integrated with Energy Storage System (ESS) and Solar photovoltaic (PV) cells. One implementation of the Emulator runs the following pseudocode:

Find the highest peak (kW) during ON PEAK hours (highest electricity price by congested pricing)
Find the lowest peak (kW) during ON PEAK hours
Calculate both monthly (seasonal effects are counted) and daily
Calculate 95% of lowest peak and compensate with highest peak with compensators of 50%, 75% and 95%, and optimized (or lowest consumption at zero)

As an example, a Client with 1,000 kW (highest peak) and 800 kW (lowest peak during ON PEAK hours)
Optimum ESS Capacity: 800 kW×95%=760 kW compensated with 76% of highest peak
Client's utility ON PEAK hours: 5 Hours Total Storage Capacity=760 kW×5 hours=3,800 kWh System Configuration of ESS: 760 kW (PCS)+3,800 kWh (Li-Battery)*—will be further adjusted by ex-factory hardware standard capacity ("name plate capacity")
*760 kW PCS+3,800 kWh Li-Battery+772 kWdc Solar PV are optimized to realize THE MAXIMUM VALUE OF ENERGY to balance rate and balance grid Solar PV uses ONLY TO FEED BATTERY (i.e., NO A/C connection to Grid)
Customer's site sun radiation hours: 6 hours (example)
Maximum capacity of energy production from Solar: 3,800 kWh calculated by battery capacity 3,800 kWh×365 days/year=1,387,000 kWh/year 1,387,000 kWh to reverse calculated PV panel capacity from NREL (PV watts calculator): 1,387,000/6 hours/ 82% (NREL)/365 days=772 kWdc of Solar PV required In one embodiment, AERS™ QBR system integration designs with existing infrastructure in mind to help utilities, state, and authorized local jurisdiction (ALJ) defer and/or reduce the cost of upgrades and improvements to accommodate societal changes such as population/development growth, climate, and/or increased electrical connecting device lifestyles by balancing the electricity usage demand synchronized with grid operation balancing 24/7/365. QBR Integration CONTROLS ENERGY AND TIME. QBR delivers precise amount of energy at the best time which often occurs highest price due to congestion of demand. QBR Integration saves BOTH DEMAND CHARGE ($/kW) and ENERGY CHARGE ($/kWh). QBR can precisely reduce Demand Peak and shows approximately 3 time more savings than that of conventional solar saving projections Conventional solar system and its capacity is designed based on fix time (NREL sun hours) and financial attributes for the solar system energy generation itself such as utility solar tariffs which are normally capped for retail rates (non-export connection) or using variable hourly wholesale rates (export connection). In other words, the solar system is not controllable and/or synced with grid balancing operation. Therefore, when highest cost of on-peak hours changes with utility and grid balancing operation of physical electron supply and demand the solar power generation from the conventional system becomes part of the "wasted" power supply in the energy transportation chain and requires more expansive peaking power generation needed for grid stability. By using AERS™ Optimum QBR system configuration of ESS+ Solar three things occur: 1) equipment costs of system integration reduces as solar becomes a DC coupled system directly into ESS power conversion system (PCS), therefore solar invertors are eliminated; 2) since solar is designed mainly for the purpose of assisting the energizing of ESS, system capacity of solar will never be more than ESS capacity and physical electrons does not directly connect to load usage directly; 3) controlled time operation of solar electron usage, which can be mostly dispatched accordingly on the hours of most needed times for both grid and usage demand, thus no alterations of utility tariff rate schedules is necessary and the dependency of sun hours can be irrelevant for grid operation.

Figure 5:
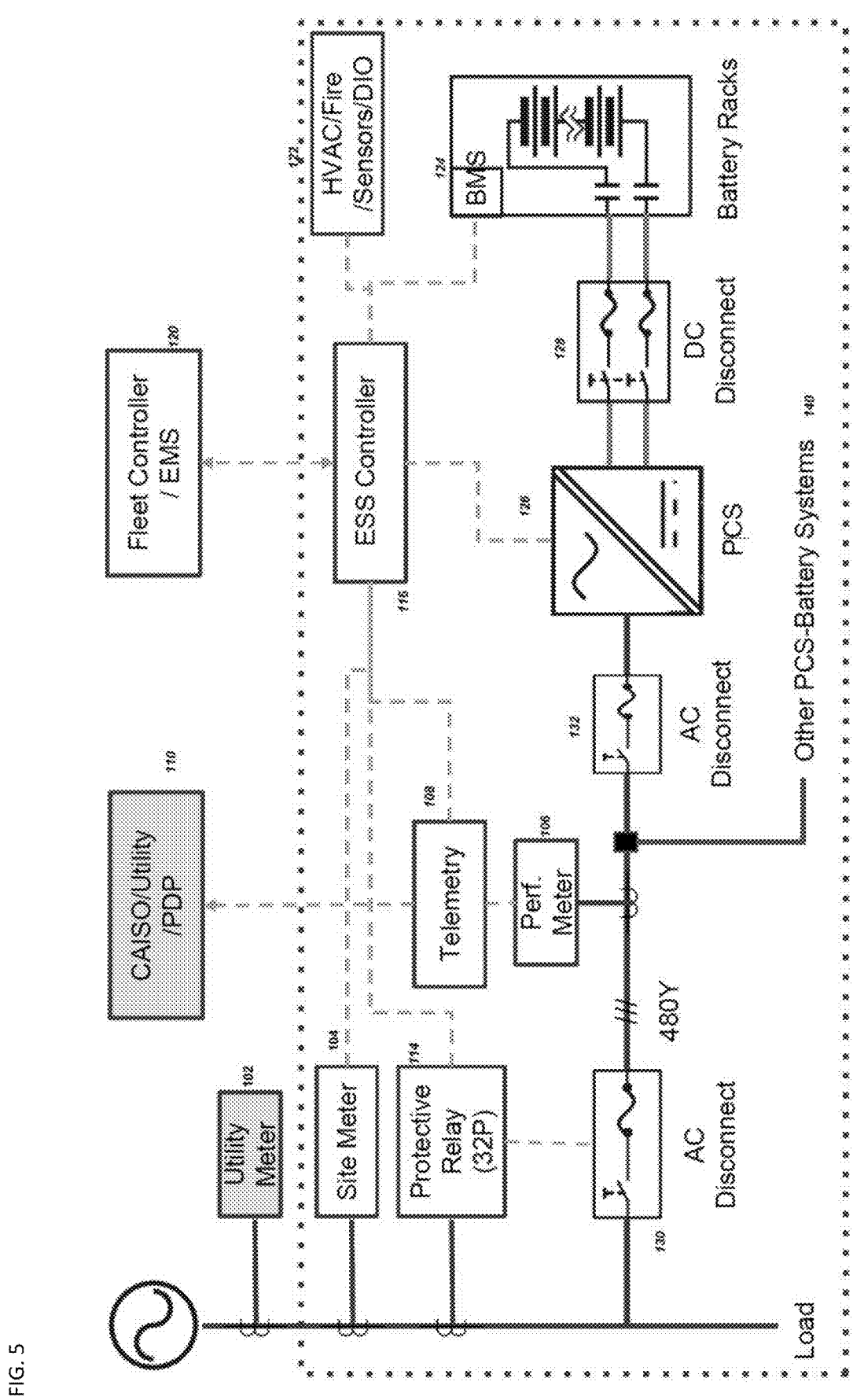
FIG. 5 shows an exemplary power management system.

FIG. 5 shows an exemplary system. In this system, power is supplied by the grid and consumed by one or more loads. Such consumption is measured by a utility meter 102 and a site meter 104, and a performance meter 106. Data captured by meter 106 is provided to a telemetry unit 108 that provides to an ISO/utility authorized communication protocol 110. The output of telemetry unit 108, along with the site meter 104, is provided to an energy storage system (ESS) controller 116. The controller 116 also receives line quality data as captured through protective relays 114. The controller 116 also controls HVAC systems, fire alarms, alert signal systems, and/or suppression systems, sensors, and input/ output devices 122. The controller 116 also controls a battery system 124 with a battery management system and a plurality of battery racks. The controller 116 can control the charging of the battery system 124 using a power conversion system 126, which has a DC disconnect 128 for safe disconnect from the battery system 124. Similarly, an AC disconnect 130 is positioned between grid power and a second AC disconnect 132 before power goes into the PCS 126. Additionally, other PCS systems or battery systems 140 can be connected to the output of the AC disconnect 130.

The ESS 116 selectively provides power in response to a customer power demand and energy usage behavior to prevent a customer grid power consumption from high spiking peaks during the grids most unstable or imbalanced high cost times. For the majority of AERS™ QBR operation, the customer's power consumption is well within the utility and grid operations baseload supply thus keeping the electric bill at the lowest cost possible. During the off-peak hours usually the baseload's low-cost rate period, the ESS is charged or energized from the grid power some or all of energy needed depending on QBR ESS or ESS+alternative power generation system installed on site. The increase of site loads off peak cost hours are minimal if any because discharging hours of QBR ESS for high cost on peak hours are mainly 6 hours or less accumulated in a 24 hours period and the lowest cost hours for charging can be spread through efficiently through a spread of the rest of 18 hours.

As the ESS 116 only kicks in on a minority of the time, the ESS 116 contains power that can be tapped into to correct grid disturbances. This ability is enhanced when aggregation of ESS 116 connected at C&I main electric switchgears that can be controlled by a network operations center (NOC) to collectively supply power into the grid by discharging for reduction of load from grid or by charging to increase load consumption when grid is over energized to address a power imbalance that can lead to brown-outs. When such collection of ESSes provide power to the grid, they can be compensated by the utility or ISO. The utility wins because it can avoid spending billions on a new powerplant, and the ESS/NOC wins with extra revenue from being a virtual power plant that can inject or reduce power for a selected period in response to a request from an ISO or a utility. Thus, the meters need to be ISO allowable and/or revenue grade meters.

In the system of FIG. 5, the utility meter and the ISO meter are revenue grade meters that conform to specifications by the utility and the ISO. Meter data represents the energy generated or consumed during a settlement interval. The ISO, ISO metered entities, and scheduling coordinator (SC) metered entities follow prescribed processes and procedures to ensure the data is settlement quality. The ISO meter performs accurate metering of electricity generated or consumed provides key data inputs for accurate settlement calculations. Direct measurement of a generator or load participant through telemetry allows the ISO or the utility to manage and monitor power generation in real-time. The specification of the meter is highly controlled, as the ISO and utility bill based on the meter output.

In one embodiment, CAISO Metered Entities ensure that the Meter Data obtained by the CAISO directly from their revenue quality meters is raw, unedited and un-aggregated Meter Data in kWh values. The CAISO or SC will be responsible for the Validation, Estimation, and Editing process of that Meter Data in order to produce Settlement Quality Meter Data.

The system of FIG. 5 conforms to utility and ISO specifications, as the ISO controls the local utilities to ensure orderly operation for electricity supply in a region. For example, the California Independent System Operator (CAISO) is a non-profit Independent System Operator (ISO) serving California and oversees the operation of California's bulk electric power system, transmission lines, and electricity market generated and transmitted by its member utilities. By providing a separate compliant meter for the ISO, the system can now participate direct to the ISO to help facilitate local utility's reliability and CAISO's grid balancing of energy supply and demand. Each QBR resource are registered with CAISO SC resource ID and AERS™ Point of Control/Trade (POC/POT) ID that are synchronized with utility rate tariff, system load meter data, and CAISO Lap Points and pNodes.

A meter and a NOC network controller can be connected to a power management system (PMS). The PMS in turn is connected to each of the aggregated ESS management system that are connected a remote on site NOC controller. Each BMS/PCS combination is tied to manual stop button or disconnect switches and circuit breakers on site to ensure safety and security of onsite system. Also, to ensure proper metering telemetry and the safety of physical electricity connection, the QBR system it is protected using protective relays approved by utilities. In turn each of the QBR POC satisfies the minimum requirement of California Public Utilities Commission Electrical Interconnection Tariff Rule 21.

Figure 4:
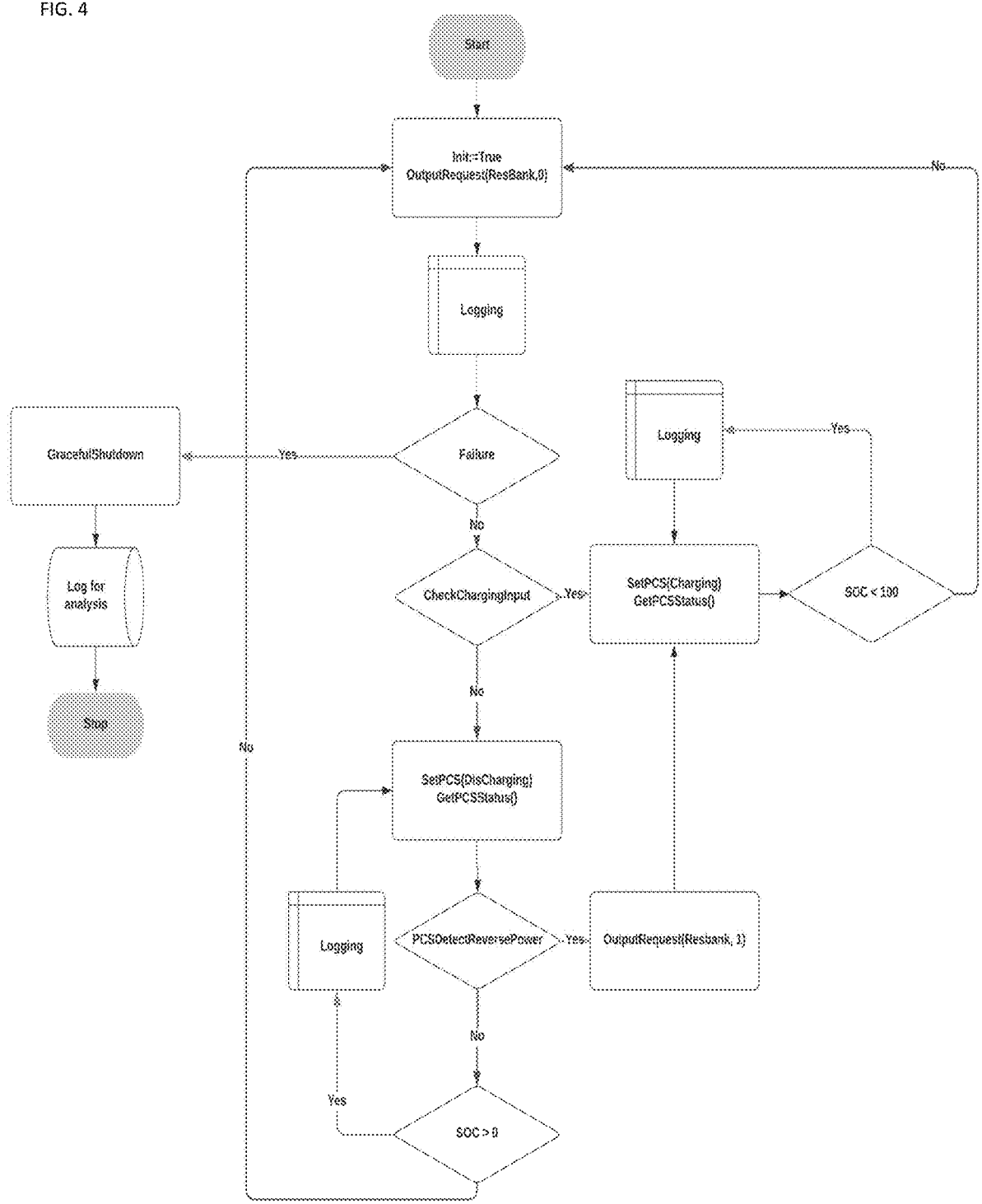
FIG. 4 shows an exemplary process for managing the operation of the system of FIG. 1B.

The charging and discharging scheduling method for ESS in FIG. 4-5 under time-of-use price applied in one embodiment, accesses the ESS as part of electricity grid device to safely and efficiently deliver electricity to and from buildings, that plays a role of load shifting, improves the safety and stability of the power and energy usage operation under time-of-use price, and meanwhile increases the efficiency of energy utilization and the economy of the transmission and distribution grid and load usage operation, that can truly make building-to-grid (B2G) feasible and controllable building demand into grid assets.

The charging and discharging scheduling method for the system of FIG. 4-5 under time-of-use price applied in one embodiment, incorporates not only the ESS, but also the photovoltaic unit, and other power sources such as gas generator, into the optimal scheduling model of B2G, which consummates the optimal scheduling model considering only the ESS.

An optional PV module can be connected to the ESS of FIG. 5. In this embodiment, the PV module provides power to the ESS that is then smoothed and used and/or stored by. As power is needed through the balancing of the grid operation chain, building's load usage can then provide and facilitate through the control of QBR systems. In another perspective the building's switchgear is upgraded to become a smart switch by adding on QBR attributes as a behind-the-meter resource for utilities and grid operators without the actual upgrade costs and time constraints. In this embodiment, a combiner collects outputs from the PV arrays, and the collective PV outputs are provided directly to a DC to DC coupled PCS connected to storage unit. When needed, the ESS drives an inverter to generate AC outputs, thus eliminates electricity loss or waste of generation. One embodiment runs the following determinations:

a. winter_energy_arbitrage=winter_partpeak_energy−winter_offpeak_energy
b. summer_energy_arbitrage=summer_maxpeak_energy−summer_partpeak_energy
c. arbitrage_avg_rate=(winter_energy_arbitrage*8+summer_energy_arbitrage*4)/12
d. energy_avg_rate=(winter_partpeak_energy*8+summer_maxpeak_energy*4)/12
e. Solar_saving_DC_yr1=Summer_Maxpeak_demand*Input_capacity*4
f. ECM_Saving_yr(n)=energy_avg_rate*Input_capacity*5*365*(1.05)n−1
g. Total_saving_yr(n)=Solar_saving_DC_yr(n)+ECM_Saving_yr(n)
h. WO_soalr_Total_yr(n)=Solar_saving_DC_yr(n)+WO_solar_ECM_yr(n)
i. HoursFilterData={A⊆Data: Data is in between 4 pm to 9 pm}
j. AERS
  i. AERS_power_base=min(HoursFilter(daily_max)*0.5, HoursFilter(daily_min)*0.95)
  ii. AERS_50=AERS_power_base*0.5
  iii. AERS_75=AERS_power_base*0.75
  iv. AERS_90=AERS_power_base*0.95
  v. AERS_OPTIMUM=For all energy usage between 4 pm to 9 pm, subtract daily_min
k. Conventional Solar PvWATT is an API call accepts parameters including input capacity, address, and so on.

i. sunhours=PvWATT(input, address)/input/30

In this embodiment, the customer's consumption history data is automatically download from Utility Servers, called "GREEN BUTTON." An emulator calculates and computes lowest peak data during TOU-ON PEAK with highest peak one per yearly, monthly and daily out of the customer's history data. The emulator computes OPTIMUM capacity of resources, such as Energy Storage System, Solar PV and Gas Generator, in order to maximize economy value of the resources. The OPTIMUM CAPACITY value generates economy projections over 20-project years. VCP is a requirement in order to apply for California SGIP incentives program. Based on VCP, the system provides the fully TOU synchronized system design, called Qualified Balance Resources (QBR). QBR provides Definitive Capacity of Resources made by one or multiple integrations from Energy Storage System, Solar PV and Gas Generator as well as Grid power. The capacity from each resource shall be computed and synchronized by TOU patterns of the users and GRID.

The AERS technology is applied with an energy management system (EMS) to operate energy storage resources from Behind-the-Retail Meter. The EMS system exists at each end, which plays the role of organically controlling and monitoring terminals such as relays, meters, BMS, and PCS. In the past, devices similar to EMS existed, but it was composed of a traditional server-client structure, having potential problems. The server-many client model has the following problems. First, the state of the server affects the entire system. Since the server has to handle real-time responses from multiple clients, the load is always high, and the server system down due to this high load is fatal to the system's reliability. Second, it is about the scalability of the server. The traditional server-client architecture makes it difficult to expand the server to support more clients. Third, servers are always vulnerable to hacking, such as attacks from hackers and malware attacks. Due to the above problems, it is not easy or impossible to implement a safe, reliable, and available system through traditional methods.

An EMS trace subsystem with transceivers communicate with the EMS global data space to provide run-time verification.

AERS embraces a distributed network's advantages, providing a global data space, quality of service (QoS), filtering, dynamic discovery, scalable architecture, and enhanced security. In this embodiment, a plurality of EMS edge publishers (or writers), each conforming to QoS requirements, communicate wirelessly over a cloud to an EMS global data space that includes BMS, Meter, PCS, and control software. A plurality of EMS edge subscriber devices (or readers) receive data from the EMS global data space.

The DDS is a state-of-the-art methodology/technology in which each node can exist independently and, at the same time, perform information exchanges. Also, AERS has an additional layer that guarantees traceability and a response within 1000 ms, making it possible to ensure real-time, which is significant in the energy market. Through this, EMS devices of AERS, which are distributed everywhere, search/build networks with each other, and in the event of a failure, they can perform safe data exchange without affecting other EMSs.

The energy market is changing from a large power plant to numerous small virtual power plants. These changes are challenging to cope with traditional system architecture/techniques, and AERS proposes a real-time, traceable system based on DDS.

The EMS Global Space is not a physical but logical domain in this embodiment, having a distributed network. Each EMS Edge first looks for the DDS-EMS network. Each node receives an acknowledgment (ACK) and receives a signal that it has successfully connected. EMS Trace records all actions that occur (black box), which is passed on to the Runtime Verification (RV) unit. Each edge performs read/write according to the QoS, and when it violates the 1000 ms operation time limit, which is global QoS, it also informs the trace. EMS Trace converts the recognized signal into a well-defined property and delivers it to the RV, and the RV performs runtime monitoring based on Linear Temporal Logic (LTL). This RV is an in-situ middleware that always checks/monitors the overall safety of the system. Pseudo-codes for the modules in include:

| Writer of EMS edge Module or Node |
| --- |
| 01 With DDS.interface.open_connector(Participant, SubParticipant) as connector |
| 02     Output = connector.get_output( ) |
| 03     Topic.register("EMSData") |
| 04     Output.wait_for_subscription(Topic) |
| 05     While(true) |
| 06       (Meter, PCS, BMS, Relay) = getEMSEdgeData( ) |
| 07       Output.setData(Meter) |
| 08       Output.setData(PCS) |
| 09       Output.setData(BMS) |
| 10       Output.setData(Relay) |
| 11       Output.write( ) |
| 12       Wait( 1000ms – time taken for getEMSEdgeData( ) – jitter ) |

| Pseudo code: EMSTrace Module or Node |
| --- |
| 01 With DDS.interface.open_connector(Participant, SubParticipant) as connector |
| 02     Input = connector.get_input( ) |
| 03     Output = connector.get_output( ) |
| 04     Topic.register("EMSData", "Trace") |
| 05     Input.wait_for_publication(Topic[0]) |

| Pseudo code: EMSTrace Module or Node |
|---|

```
06    Output.wait_for_subscription(Topic[1])
07    While(true)
08       Input.wait( )
09       Input.take( )
10       Array of microOperations = convertToMicroOperations(Input.instance.get( ))
11       Database.insert(Array of microOperations)
12       Output.setData( convertToProperty(Input.instance.get( ))
```

| Pseudo code: Reader of EMS edge Module or Node |
|---|

```
01  With DDS.interface.open_connector(Participant, SubParticipant) as connector
02     Input = connector.get_input( )
03     Topic.register("EMSData")
04     Input.wait_for_publication(Topic)
05     While(true)
06        AERS_Algorithm( )
07        Input.wait( )
08        Input.take( )
09        (Command, Argument0, Argument1, Argument2) = Input.instance.get( )
10        EMSCommand(Command, Argument0, Argument1, Argument2)
```

CEP Unit: Return to Normal Power Operation

The 27/47 relay shall sense that commercial/utility power has returned. The relay (N.O. aux. contact) shall energize, thus closing the charging contactor and opening the discharging contactor, and PCS shall stop discharging, i.e., EMS shall change mode of PCS/inverter from discharging to charging and the PCS shall begin charging (corresponding auxiliary contacts shall change state, DI/O module shall receive change of state on its inputs). The ATS shall switch back to the primary position. The CEP unit resumes charging if its battery state of charge is less than 75%.

CEP Emergency Power Description of Operation

I. Description of Emergency Power Operation

The CEP emergency power unit is in charging mode while commercial/utility power is on. This is a result of the undervoltage/phase imbalance relay energizing a contactor coil that closes a charging circuit to the CEP unit. The PCS/inverter will charge the batteries of the CEP unit until they reach 75% of their capacity. If, while commercial power is on, the elevator provides regenerative power and it reaches the CEP unit, the CEP unit will allow the PCS to charge the batteries up to 100% of their capacity. Once batteries reach 100% charge capacity, the EMS (energy management system) will allow a resistor bank to connect to the charging circuit if regenerative power is created by elevator (this occurs whether commercial power is on or off). When commercial power is lost, the undervoltage/phase imbalance relay de-energizes the charging contactor circuit to the CEP unit, while energizing a contactor coil that closes a discharging circuit from the CEP unit to an automatic transfer switch (ATS), which feeds the elevator and its ancillary load. Consequently, the ATS shall switch from the primary position to the secondary position. Thus, this configuration shall allow the CEP unit to operate the elevator and its ancillary loads in the instance where there is no commercial power. When commercial power is restored, the undervoltage/phase imbalance relay de-energizes the discharging circuit and re-energizes charging circuit of the CEP unit. The ATS switches from the secondary position to the primary position. The CEP unit resumes charging if its battery capacity is less than 75%.

CEP Unit: Regenerative Power

If the batteries' state of charge=100% and elevator provides regenerative power (elevator is going down or coming to a stop), the power shall be dissipated through a resistor bank connected in parallel to the AC circuit of the CEP unit.

A contactor enclosure shall be used to connect the resistor bank's load to the AC circuit to dissipate regenerative power, and the contactor shall be controlled by a discrete output N.O. contact from the EMS DI/O module.

CEP Unit: Shut Down Modes a. If the thermal switch of the resistor bank opens (i.e., resistor bank has overheated and its temperature is > or = to 150 degrees C.), the emergency battery power unit (BESS) shall be shut down.

b. If the state of charge (SOC) of the CEP unit is less than or equal to 5% of batteries' state of charge, the CEP unit shall be shut down.

c. If the temperature of CEP unit is greater than or equal to the threshold temperature, the CEP unit shall be shut down.

Profile I: Normal Power Operation (N)

Initial States

NI-0: The 27/47 Relay shall be energized.

The N.O. auxiliary contact of relay shall energize the relay coil of the charging contactor while the charging contactor enclosure is in auto mode.

The N.C. auxiliary contact of relay shall be open so that the coil of the discharging contactor remains de-energized while the discharging contactor enclosure is in auto mode.

NI-1: CU2 charging circuit contactor shall be energized (closed).

The N.O. auxiliary contact of charging contactor shall be monitored by DI #1 of DIO>>CU1.

NI-2: CU2 discharging circuit contactor shall be de-energized (open).

N.C. auxiliary contact of discharging contactor shall be monitored by DI #0 of DIO>>CU1.

NI-3: PCS shall be in ON GRID mode.
  PCS shall be connected by ethernet to CU1 (read only).
NI-4: BESS SOC shall be maintained at 75% by commercial or regen power.
  BMS shall be connected by ethernet to CU1.
NI-5: UPS SOC shall be maintained at 100% by commercial or regen power.
  UPS shall feed power to CU1.
  UPS shall be connected by ethernet to CU1.
NI-6: CU3 circuit contactor shall be de-energized (open).
  The N.O. contact shall be monitored by DI #2 of DIO>>CU1.
NI-7: Resistor Bank Thermal Switch shall be monitored by DI #3 of DIO>>CU1.
NI-8: ATS shall be in the primary (normal) source position.
  ATS shall be monitored by DI #4 of DIO>>CU1.
NI-9: (Optional) Building fire panel shall be monitored by DI #5 of DIO>>CU1.
Sequence
  NS-0: EMS shall set PCS state (via BMS) based on the BESS SOC.
    IF BESS SOC<75%:
      If DI #2 is closed, EMS shall command DIO RL #0 to set the resistor bank contactor>>CU3 to open.
      Set PCS state to CHARGE by commercial or regen power.
    ELSE:
      Set PCS state to IDLE (no charge, no discharge).
Profile II: Emergency Power Operation (E)
Sequence
  ES-0: The 27/47 relay shall sense no power, undervoltage or phase loss/imbalance.
  ES-1: The relay shall de-energize, opening (de-energizing the contactor coil) the charging contactor and closing (energizing) the discharging contactor>>CU2.
  ES-2: Corresponding auxiliary contacts>>CU2 shall change state, providing input to DIO>>CU1 and thus notifying EMS of emergency status.
  ES-3: EMS shall set PCS mode (via BMS) to OFF GRID.
    This will set the PCS state to CHARGE automatically when regen power is detected.
  ES-4-A: PCS state shall be determined by one of the following:
    IF PCS does not sense regen power:
      If DI #2 is closed, EMS shall command DIO RL #0 to set the resistor bank contactor>>CU3 to open.
      THEN EMS shall set PCS state (via BMS) to DISCHARGE.
    ELSE (PCS senses regen power):
      WHILE PCS mode=Off Grid (PCS retains control of BMS):
        IF DI #2 is closed, EMS shall command DIO RL #0 to set the resistor bank contactor>>CU3 to open.
        IF PCS senses regen power, then PCS shall set BMS to CHARGE.
        ELSE PCS shall set BMS to DISCHARGE.
  ES-4-B: The ATS shall switch from primary to secondary (emergency) position automatically when first discharge from BESS is sensed.
  ES-5: UPS SOC shall be maintained at 100% by BESS or regen power until BESS SOC is exhausted.
Profile III: Return to Normal Power Operation (R)
Sequence
  RS-0: The 27/47 relay shall sense that commercial/utility power has returned.
  RS-1: The relay (N.O. aux. contact) shall energize, thus closing the charging contactor and opening the discharging contactor.
    Corresponding auxiliary contacts shall change state. DIO>>CU1 shall receive the change of state on its inputs, thus notifying EMS of normal operation status.
  RS-2: The ATS shall switch back to the primary position when commercial power is sensed.
  RS-3: EMS shall set PCS mode (via BMS) to ON GRID.
  RS-4: EMS shall re-engage sequence NS-0.
  RS-5: UPS shall charge, if needed, from commercial or regen power until UPS SOC=100%.
Profile IV: Persistent Operation (P)
These functions are maintained across all operation profiles.
  P-0: IF BESS SOC=100% OR PCS topping voltage>=value:
    EMS shall not permit PCS state (via BMS) to CHARGE,
    EMS shall command DIO RL #0 to set the resistor bank contactor>>CU3 to closed.
      This permits the regen power due to potential and/or kinetic energy to be dissipated through a resistor bank connected in parallel to the AC circuit of the CEP unit.
  P-1: EMS shall set the PCS state (via BMS) to IDLE:
    IF BESS temperature>=threshold° C.
    OR BESS SOC<=threshold %.
    OR Thermal Switch temperature>150° C. (opens DI #3).
  P-2: EMS shall internally log status of all CEP components until a graceful shutdown is commanded:
    UPS SOC<=threshold.
    OR (OPTIONAL) a fire is detected by the building fire panel and is communicated to DI #5.
  P-3 (OPTIONAL): IF EMS detects a USB-A drive has been inserted:
    Check for firmware updates. IF LocalVer<NewVer:
      EMS shall download and update firmware.
      AND copy all logs to the drive.
    ELSE
      Copy all logs to the drive.
  P-4 (OPTIONAL): IF EMS detects LTE module, send the following over the network:
    All logs stored in the local database.
    Any new logs generated in real-time.

Figure 3:
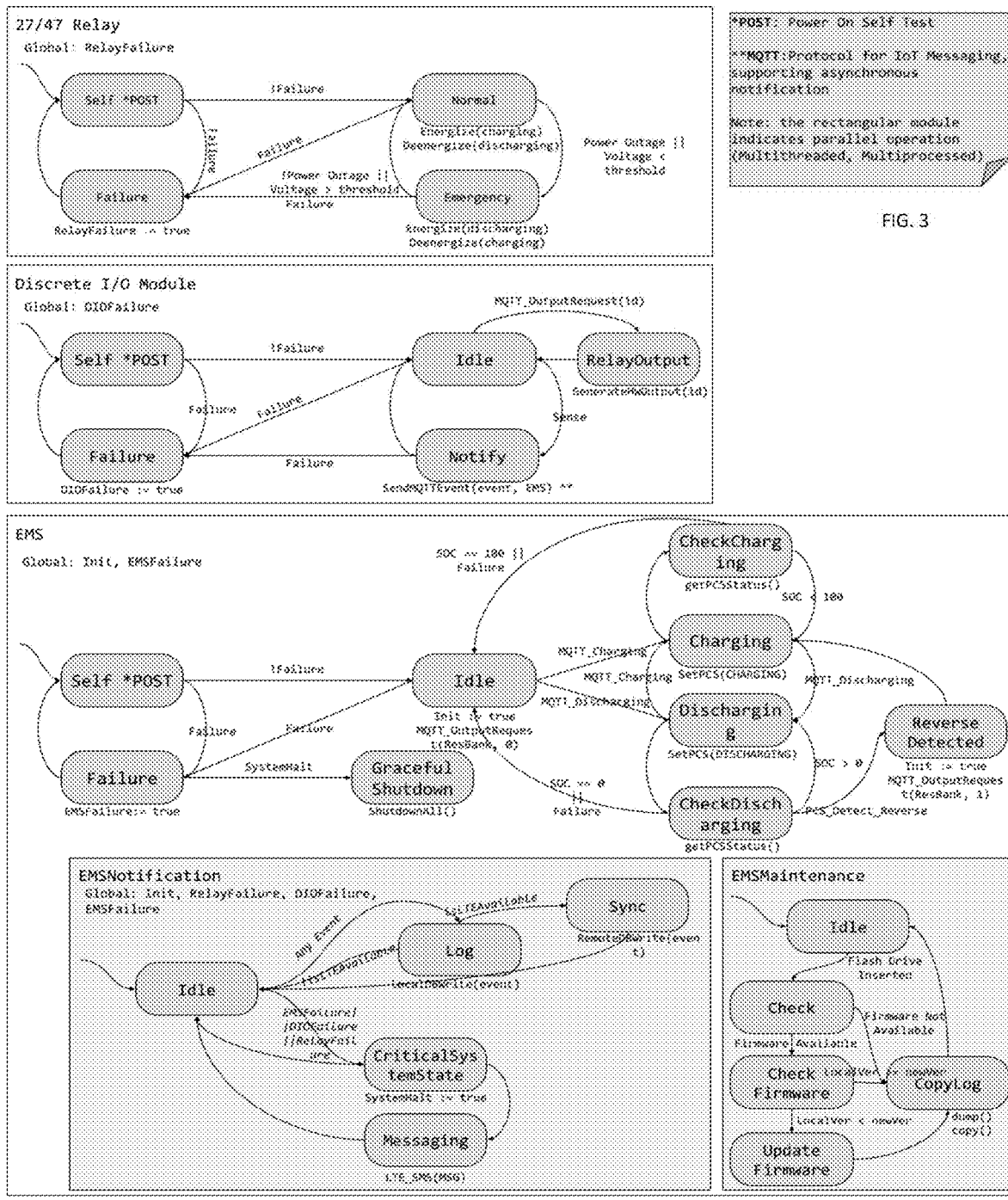
FIG. 3 shows exemplary state transition graphs illustrating the operation of the system of FIG. 2.

The CVP Emergency Power backup system provides emergency power during utility power outages permitting elevators to function. This Sequence of Operations is for elevators with regenerative power and includes an integrated electrical and communication single line diagram and four operation profiles. FIG. 3 shows exemplary state diagrams of the system in accordance with the four profiles above, while FIG. 4 shows an exemplary process for managing the operation of the system of FIG. 1B in accordance with these four profiles.

Table 1 shows the truth table, which has all combinations of contactor status, showing the status of the contactor, the main module of the system, and the result.

TABLE 1

Contactors Behavior and Corresponding Result

| Charging Contactor | Discharging Contactor | Resistor Bank Contactor | Thermal Switch | PCS (Reverse Power) | ATS Position | Result |
|---|---|---|---|---|---|---|
| 0 | 0 | 0 | 0 | 0 | 0 | Critical Failure |
| 0 | 0 | 0 | 0 | 0 | 1 | Critical Failure |
| 0 | 0 | 0 | 0 | 1 | 0 | Critical Failure |
| 0 | 0 | 0 | 0 | 1 | 1 | Critical Failure |
| 0 | 0 | 0 | 1 | 0 | 0 | Critical Failure |
| 0 | 0 | 0 | 1 | 0 | 1 | Critical Failure |
| 0 | 0 | 0 | 1 | 1 | 0 | Critical Failure |
| 0 | 0 | 0 | 1 | 1 | 1 | Critical Failure |
| 0 | 0 | 1 | 0 | 0 | 0 | Critical Failure |
| 0 | 0 | 1 | 0 | 0 | 1 | Critical Failure |
| 0 | 0 | 1 | 0 | 1 | 0 | Critical Failure |
| 0 | 0 | 1 | 0 | 1 | 1 | Critical Failure |
| 0 | 0 | 1 | 1 | 0 | 0 | Critical Failure |
| 0 | 0 | 1 | 1 | 0 | 1 | Critical Failure |
| 0 | 0 | 1 | 1 | 1 | 0 | Critical Failure |
| 0 | 0 | 1 | 1 | 1 | 1 | Critical Failure |
| 0 | 1 | 0 | 0 | 0 | 0 | BESS shutdown |
| 0 | 1 | 0 | 0 | 0 | 1 | BESS shutdown |
| 0 | 1 | 0 | 0 | 1 | 0 | BESS shutdown |
| 0 | 1 | 0 | 0 | 1 | 1 | BESS shutdown |
| 0 | 1 | 0 | 1 | 0 | 0 | Critical Failure |
| 0 | 1 | 0 | 1 | 0 | 1 | ES-3 Discharge, ES-6 |
| 0 | 1 | 0 | 1 | 1 | 0 | Critical Failure |
| 0 | 1 | 0 | 1 | 1 | 1 | ES-3 Charge, ES-6 |
| 0 | 1 | 1 | 0 | 0 | 0 | BESS shutdown |
| 0 | 1 | 1 | 0 | 0 | 1 | BESS shutdown |
| 0 | 1 | 1 | 0 | 1 | 0 | BESS shutdown |
| 0 | 1 | 1 | 0 | 1 | 1 | BESS shutdown |
| 0 | 1 | 1 | 1 | 0 | 0 | Critical Failure |
| 0 | 1 | 1 | 1 | 0 | 1 | ES-3 Discharge, ES-6 |
| 0 | 1 | 1 | 1 | 1 | 0 | Critical Failure |
| 0 | 1 | 1 | 1 | 1 | 1 | ES-3 Idle, ES-4, ES-6 |
| 1 | 0 | 0 | 0 | 0 | 0 | BESS shutdown |
| 1 | 0 | 0 | 0 | 0 | 1 | BESS shutdown |
| 1 | 0 | 0 | 0 | 1 | 0 | BESS shutdown |
| 1 | 0 | 0 | 0 | 1 | 1 | BESS shutdown |
| 1 | 0 | 0 | 1 | 0 | 0 | NI-3, NS-0 Charge (BESS SOC <= 75%) or NS-0 Idle (BESS SOC = 100%) |
| 1 | 0 | 0 | 1 | 0 | 1 | Critical Failure |
| 1 | 0 | 0 | 1 | 1 | 0 | NI-3, NS-0 Charge |
| 1 | 0 | 0 | 1 | 1 | 1 | Critical Failure |
| 1 | 0 | 1 | 0 | 0 | 0 | BESS shutdown |
| 1 | 0 | 1 | 0 | 0 | 1 | BESS shutdown |
| 1 | 0 | 1 | 0 | 1 | 0 | BESS shutdown |
| 1 | 0 | 1 | 0 | 1 | 1 | BESS shutdown |
| 1 | 0 | 1 | 1 | 0 | 0 | Critical Failure |
| 1 | 0 | 1 | 1 | 0 | 1 | Critical Failure |
| 1 | 0 | 1 | 1 | 1 | 0 | NI-3, NS-0 Idle ES-4 |
| 1 | 0 | 1 | 1 | 1 | 1 | Critical Failure |
| 1 | 1 | 0 | 0 | 0 | 0 | Critical Failure |
| 1 | 1 | 0 | 0 | 0 | 1 | Critical Failure |
| 1 | 1 | 0 | 0 | 1 | 0 | Critical Failure |
| 1 | 1 | 0 | 0 | 1 | 1 | Critical Failure |
| 1 | 1 | 0 | 1 | 0 | 0 | Critical Failure |
| 1 | 1 | 0 | 1 | 0 | 1 | Critical Failure |
| 1 | 1 | 0 | 1 | 1 | 0 | Critical Failure |
| 1 | 1 | 0 | 1 | 1 | 1 | Critical Failure |
| 1 | 1 | 1 | 0 | 0 | 0 | Critical Failure |
| 1 | 1 | 1 | 0 | 0 | 1 | Critical Failure |
| 1 | 1 | 1 | 0 | 1 | 0 | Critical Failure |
| 1 | 1 | 1 | 0 | 1 | 1 | Critical Failure |
| 1 | 1 | 1 | 1 | 0 | 0 | Critical Failure |

TABLE 1-continued

Contactors Behavior and Corresponding Result

| Charging Contactor | Discharging Contactor | Resistor Bank Contactor | Thermal Switch | PCS (Reverse Power) | ATS Position | Result |
|---|---|---|---|---|---|---|
| 1 | 1 | 1 | 1 | 0 | 1 | Critical Failure |
| 1 | 1 | 1 | 1 | 1 | 0 | Critical Failure |
| 1 | 1 | 1 | 1 | 1 | 1 | Critical Failure |

0: Open Contactor, ATS Normal/Primary Position, False
1: Close Contactor, ATS Emergency/Secondary Postion, True In some embodiments, the above systems may be implemented as a cloud-based computing environment, such as a virtual machine operating within a computing cloud. In other embodiments, the computer system may itself include a cloud-based computing environment, where the functionalities of the computer system are executed in a distributed fashion. Thus, the computer system, when configured as a computing cloud, may include pluralities of computing devices in various forms, as will be described in greater detail below. In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources. The cloud may be formed, for example, by a network of web servers that comprise a plurality of computing devices, such as the computer system, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A system to supply emergency power to an elevator, comprising:
    one or more lithium batteries,
    an inverter having an idle, on or off condition and coupled to the lithium batteries,
    a battery management system (BMS) coupled to the inverter,
    an Energy Management System (EMS) coupled to the BMS,
    a relay coupled to utility power;
    a charging contactor activated or deactivated by the relay and providing status to the EMS; and
    a discharging contactor activated or deactivated by the relay and providing status to the EMS,
    wherein the EMS sets the inverter idle, on or off based on the state of the charging contactor, the state of the discharging contactor, a state of charge (SOC) of the batteries, and a system safety status, wherein the relay provides utility power to the system and notifies the EMS that utility power is on, wherein the EMS initiates charging of the BMS, wherein the BMS sends charging command to the inverter until the SOC reaches 100%, where the inverter is in idle.

2. The system of claim 1, wherein the BMS is in a charging mode while commercial or utility power is on.

3. The system of claim 2, wherein the relay is an undervoltage/phase imbalance relay and the charging contactor coil closes a charging circuit.

4. The system of claim 1, wherein the inverter charges the batteries to 75% of capacity.

5. The system of claim 1, wherein the inverter reports the SOC, a state of health (SOH) and temperature to the BMS for management and when the batteries are charged, the BMS reports completion to the EMS.

6. The system of claim 1, wherein while power is on, the elevator provides regenerative power to the BMS, the BMS charges the batteries and once batteries reach 100% capacity, the EMS connects a resistor bank to the charging circuit to absorb excess power from the elevator.

7. The system of claim 3, wherein when power is lost, the undervoltage/phase imbalance relay de-energizes a charging contactor circuit, and energizes a contactor coil that closes a discharging circuit from the BMS to an automatic transfer switch (ATS) coupled to the elevator and an ancillary load.

8. The system of claim 7, wherein the ATS switches from the primary position to the secondary position to operate the elevator and the ancillary load when there is no utility power.

9. The system of claim 7, wherein when power is restored, the undervoltage/phase imbalance relay de-energizes the discharging circuit and re-energizes charging circuit of the BMS and the ATS switches from the secondary position to the primary position.

10. The system of claim 1, comprising a circuit to shutdown the system if a thermal switch of a resistor bank opens, a state of charge (SOC) is less than or equal to 5% of battery capacity, or a threshold temperature is met.

11. A method to supply emergency power to an elevator having one or more lithium batteries, an inverter coupled to the lithium batteries, a battery management system (BMS) coupled to the inverter, an Energy Management System (EMS) coupled to the BMS, and a relay coupled to utility power, the method comprising:
operating the relay to provide utility power to the system and notifying the EMS that utility power is on, wherein the EMS initiates charging of the BMS system, wherein the BMS sends charging command to the inverter until a state of charge (SOC) is 100%, where the inverter goes into a standby mode;
providing emergency power during a power outage permitting the elevator to function with a sequence of operations with regenerative power; and
activating or deactivating a discharging contactor by the relay and communicating contactor status to the EMS which sets the inverter idle, on or off based on the state of the charging contactor, the state of the discharging contactor, a battery state of charge (SOC), and a system safety status.

12. The method of claim 11, comprising placing the BMS in a charging mode while utility power is on.

13. The method of claim 12, comprising energizing a contactor coil by an undervoltage/phase imbalance relay and closing a charging circuit.

14. The method of claim 11, comprising charging the batteries until 75% of capacity.

15. The method of claim 11, comprising reporting the SOC, a state of health (SOH) and temperature to the BMS for management; when the battery is charged, the BMS reports completion to the EMS.

16. The method of claim 11, comprising providing regenerative power from the elevator to the BMS with power on to charge the batteries up to 100% of capacity and thereafter connecting a resistor bank to the charging circuit if regenerative power is created by elevator.

17. The method of claim 11, comprising de-energizing a charging contactor circuit by the undervoltage/phase imbalance relay during a power outage while energizing a contactor coil that closes a discharging circuit from the BMS to an automatic transfer switch (ATS) and providing power to the elevator and an ancillary load.

18. The method of claim 17, comprising switching the ATS from the primary position to the secondary position to operate the elevator and ancillary load during a power outage.

19. The method of claim 17, comprising de-energizing the discharging circuit by the undervoltage/phase imbalance relay when power is restored and re-energizing a charging circuit of the BMS and switching the ATS from the secondary position to the primary position.

20. The method of claim 11, comprising performing a system shutdown if a thermal switch of a resistor bank opens, the SOC is less than or equal to 5% of battery capacity, or a threshold temperature is met.

* * * * *